Aug. 25, 1925.　　　　　　　　　　　　　　　　　1,551,447
A. E. WILDE
SAFETY DEVICE FOR GROMMET MACHINES
Filed Aug. 19, 1922
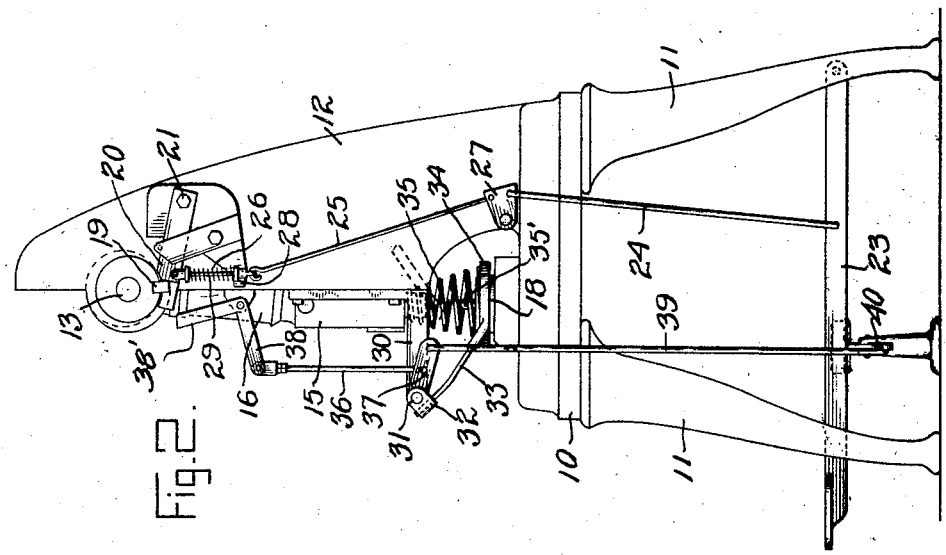
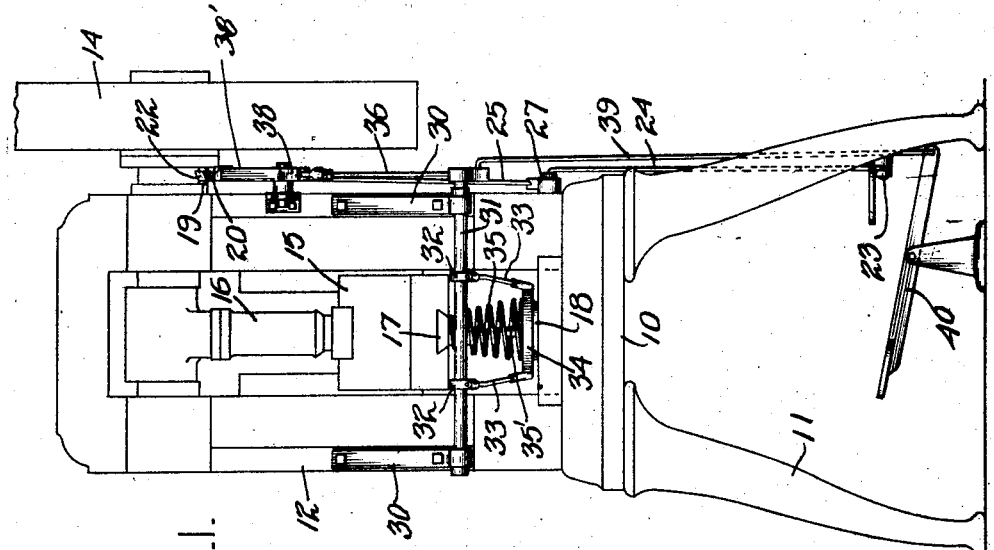
Inventor
Alexander E. Wilde.
By
Attorney Patented Aug. 25, 1925.

1,551,447

UNITED STATES PATENT OFFICE.

ALEXANDER E. WILDE, OF RIVERDALE, MARYLAND, ASSIGNOR TO ALEXANDER WILDE, OF UNION, NEW JERSEY.

SAFETY DEVICE FOR GROMMET MACHINES.

Application filed August 19, 1922. Serial No. 583,052.

*To all whom it may concern:*

Be it known that I, ALEXANDER E. WILDE, a citizen of the United States, residing at Riverdale, in the county of Prince Georges and State of Maryland, have invented certain new and useful Improvements in Safety Devices for Grommet Machines, of which the following is a specification.

My said invention relates to a safety device for grommet machines and it is an object of the invention to provide interlocking means which when applied to such a machine shall protect the operative against mutilation such as frequently occurs in the use of unprotected machines of this type. The specific features of my device are intended to cooperate primarily with a grommet machine, nevertheless mechanisms within the scope of my invention may be applied to various other types of machines and particularly to punching machines and the like.

In the use of my invention the interlocking mechanisms prevent operation of the machine when work is being placed therein and it is a further object of my invention to provide a guard which shall become operative after the work is placed in the machine and the same is set in operation.

Still another object is to provide a guard of special form particularly adapted to punching machines and the like.

Referring to the accompanying drawings, which are made a part hereof and on which similar reference characters indicate similar parts, Figure 1 is a front elevation of my device, and Figure 2 a side elevation of the same with parts omitted, each of the views showing the parts in the same operative position.

In the drawings 10 indicates a table supported on legs 11 and carrying a main frame member 12 in which is journaled a shaft 13 carrying a pulley 14 adapted to be clutched to the shaft or unclutched therefrom by mechanism here shown as having a one-revolution clutch and related parts such as are shown in the patent to Candee No. 920,726, May 4, 1909. The shaft has a crank driving a slide 15 through pitman 16 and the slide has at its lower end a punch or former 17 cooperating with an anvil 18 forming a work support. The clutch engaging member consists of a pin 19 slidably mounted on the shaft 13 and adapted to engage in a hole in the hub of pulley 14. Pin 19 is spring-impelled to engage the clutch and is retracted by a clutch tripper or actuator 20 pivoted at 21 and having a cam edge at 22 for engaging in a notch in the pin. The actuator is controlled by a foot lever 23 connected thereto by links 24, 25, and 26, and an intermediate pivoted member 27. The link 26 passes through an eye 28 on a fixed part of the frame and a spring 29 surrounds the link and forces the same in a direction to move the tripper for disengaging the clutch. The parts hitherto described are old in the art and in the main are illustrated in the patent above referred to.

According to my invention two brackets 30 are mounted on the front of the machine and a shaft 31 is journaled in said brackets. The shaft has a pair of rock arms 32 which support rods 33 carrying a ring 34. A spiral spring 35 is supported on ring 34 and surrounds the upwardly projecting pin 35' of the anvil. At its upper end the spring encircles the downwardly projecting former on the slide 15.

A link 36 connects rock arm 37 on shaft 31 to a bent lever 38 pivoted on the fixed frame near the actuator 20, said lever having an upwardly extending rock arm 38'. The upper end of said rock arm is adapted to engage underneath the tripper 20 and prevent its withdrawal from the pin 19 thus preventing engagement of the clutch. A link 39 is also secured to link 37 and extends downwardly therefrom to a pedal 40.

In a typical operation of my device it is used for attaching grommets to mail bags of conventional type. For this purpose a hole is punched in the bag and the members of a grommet are placed on opposite sides thereof, after which the bag is placed on the anvil 18 with the pin 35' projecting through the hole and holding the parts in place on the anvil. The pedal 23 is depressed to release the pin 19 and permit engagement of the clutch with the constantly driven pulley 14. With the present additions the guard 35 is normally in the position shown and must be raised before a mail bag can be placed on the anvil. When the pedal 40 is depressed to permit such operation the ring 34 will be raised to the dotted line position compressing the guard spring. At the same time that the ring 34 is moved the arm 37 will be lifted and through the link 36 will swing the rock arm 38' to place its end beneath the tripper 20, the result of this being that the clutch cannot be engaged while the operator is placing a bag in position on the anvil. Neither can the operator place his hands in dangerous position while the machine is running since at such times the tripper 20 is necessarily depressed in to the path of the rock arm 38' (as will be seen from consideration of Figure 1) so that the free end of the rock arm 38' cannot be moved and therefore the guard cannot be raised, the tripper 20 and the rock arm 38' each blocking the operation of the other.

It will be obvious to those skilled in the art that my device may be modified in various ways as to accommodate it for use with machines of various types and having different functions, therefore I do not limit myself to the specific form of the machine as shown in the drawings and described in the specification but only as indicated in the appended claims.

Having thus fully described my said invention, what I claim as new and desire to secure by Letters Patent, is:

1. In a grommet machine, a work-support, a punch reciprocating relatively thereto, a guard comprising a spring surrounding the punch and enclosing the space between it and the work-support, and means for compressing the spring to withdraw the guard, substantially as set forth.

2. In a grommet machine, a work-support, a punch reciprocating relatively thereto, a spring surrounding the punch and enclosing the space between it and the work-support, a ring engaging the lower end of the spring, a rockshaft adapted to lift the ring and compress the spring, and manually operated means for moving said rockshaft, substantially as set forth.

3. In a stop mechanism, a work-support, a ring surrounding the same, a member reciprocating relatively thereto, a spiral spring enclosing the space between the work-support and the reciprocating member, a rock-shaft adjacent the ring, means connecting the ring to the rockshaft for compressing the spring by movement of the rockshaft, and a treadle for moving the rock shaft, substantially as set forth.

4. In a stop mechanism, a clutch having a pin slidable on one member and adapted to engage a hole in the other, a cam for retracting the pin, a guard for a member of the machine, and a bent lever connected at one end to the guard and adapted to engage said cam with its other end for locking the pin in unclutching position, substantially as set forth.

5. In a stop mechanism, a clutch having a pin slidable on one member and adapted to engage a hole in the other, a pivoted cam for retracting the pin, a guard for a working part of the machine, and a lever having its pivot parallel to that of the cam connected at one end to the guard and adapted to engage said cam with its other end for locking the pin in unclutching position substantially as set forth.

6. In a stop mechanism, a clutch, a tripper for disengaging the clutch, a guard for a working part of the machine, said guard being movable into and out of operative position, a part positively connected to the guard to move therewith said part moving into and out of the path of said tripper whereby the clutch can be disengaged only when the guard is in operative position, substantially as set forth.

7. A machine having a reciprocating working member, a collapsible guard therefor surrounding its path of movement, driving mechanism, controlling means therefor, and operating means for collapsing the guard said operating means and said controlling means each blocking the operation of the other, substantially as set forth.

8. In a grommet machine, a work-support, a punch reciprocating relatively thereto, a spring surrounding the punch and enclosing the space between it and the work-support, means for compressing the spring to permit access to the work-support including a rockshaft, means for driving the machine including a clutch, means to prevent actuation of said clutch when the spring is compressed, and means for preventing compression of the spring when the clutch is engaged, substantially as set forth.

9. In a stop mechanism, a clutch, a pivoted tripper for said clutch, a guard for a working part of the machine, and a lever positively connected to the guard, said lever and tripper each blocking the operation of the other, substantially as set forth.

10. In a stop mechanism, a clutch, a tripper for said clutch, a rod attached to the tripper for operating the same, a guard for a working part of the machine, and a lever positively connected to the guard said lever and said tripper each blocking the operation of the other, substantially as set forth.

In witness whereof, I have hereunto set my hand at Washington, District of Columbia, this 19th day of August, A. D. nineteen hundred and twenty-two.

ALEXANDER E. WILDE.